United States Patent
Roberson et al.

(10) Patent No.: US 10,273,799 B2
(45) Date of Patent: Apr. 30, 2019

(54) WELL RANGING APPARATUS, SYSTEMS, AND METHODS

(71) Applicant: Halliburton Energy Services, Inc., Houston, TX (US)

(72) Inventors: Brian Roberson, The Woodlands, TX (US); Hsu-Hsiang Wu, Sugar Land, TX (US); Randal Thomas Beste, Katy, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 281 days.

(21) Appl. No.: 14/769,525

(22) PCT Filed: Aug. 4, 2015

(86) PCT No.: PCT/US2015/043566
§ 371 (c)(1),
(2) Date: Aug. 21, 2015

(87) PCT Pub. No.: WO2016/025232
PCT Pub. Date: Feb. 18, 2016

(65) Prior Publication Data
US 2016/0273340 A1    Sep. 22, 2016

Related U.S. Application Data

(60) Provisional application No. 62/035,877, filed on Aug. 11, 2014, provisional application No. 62/037,440, (Continued)

(51) Int. Cl.
*E21B 47/02*    (2006.01)
*E21B 47/022*    (2012.01)
(Continued)

(52) U.S. Cl.
CPC .......... *E21B 47/02216* (2013.01); *E21B 7/04* (2013.01); *E21B 33/14* (2013.01);
(Continued)

(58) Field of Classification Search
CPC ...... E21B 47/02216; E21B 7/04; E21B 33/14; E21B 47/024; E21B 47/122; E21B 47/12;
(Continued)

(56) References Cited

U.S. PATENT DOCUMENTS 4,372,398 A * 2/1983 Kuckes .................. E21B 47/02
                                                        166/66.5
4,443,762 A    4/1984 Kuckes
(Continued)

FOREIGN PATENT DOCUMENTS

WO    WO-2007/015087 A1    2/2007
WO    WO-2012/134468 A1    10/2012
(Continued)

OTHER PUBLICATIONS

Definition of well head accessed through Schlumberger Oilfield Glossary on Nov. 15, 2016 via http://www.glossary.oilfield.slb.com/Terms/w/wellhead.aspx, 2 pages.
(Continued)

*Primary Examiner* — Tan T. Nguyen
(74) *Attorney, Agent, or Firm* — Gilliam IP PLLC (57) ABSTRACT

Embodiments include well ranging apparatus, systems, and methods which operate to measure a total magnetic field strength at each of three sensors attached to a down hole tool housing, wherein each sensor is to provide normal, tangential, and longitudinal field strength component amplitude values, and wherein at least one of the sensors is attached to the housing spaced approximately equidistant from the other two sensors in an azimuthal plane of the housing, and wherein each of the sensors is spaced apart from the other
(Continued)

sensors in a longitudinal direction of the housing. Further activity includes determining at least three gradient field values from the total magnetic field strength measured by the three sensors, and determining an approximate range from a first well in which the sensors are disposed, to a casing of a second well, using the at least three gradient field values. Additional apparatus, systems, and methods are disclosed.

30 Claims, 10 Drawing Sheets

Related U.S. Application Data filed on Aug. 14, 2014, provisional application No. 62/078,732, filed on Nov. 12, 2014.

(51) Int. Cl.
| | |
|---|---|
| *G01V 3/26* | (2006.01) |
| *E21B 7/04* | (2006.01) |
| *E21B 33/14* | (2006.01) |
| *E21B 47/024* | (2006.01) |
| *G01V 99/00* | (2009.01) |
| *G06F 17/11* | (2006.01) |
| *E21B 43/24* | (2006.01) |
| *E21B 47/12* | (2012.01) |
| *E21B 47/18* | (2012.01) |

(52) U.S. Cl.
CPC .............. *E21B 47/024* (2013.01); *G01V 3/26* (2013.01); *G01V 99/005* (2013.01); *G06F 17/11* (2013.01); *E21B 43/2406* (2013.01); *E21B 47/12* (2013.01); *E21B 47/122* (2013.01); *E21B 47/18* (2013.01)

(58) Field of Classification Search
CPC ........ E21B 47/18; G01V 3/26; G01V 99/005; G06F 17/11
USPC ........................................................ 702/6, 9
See application file for complete search history.

(56) References Cited

U.S. PATENT DOCUMENTS

| | | | |
|---|---|---|---|
| 4,700,142 A | 10/1987 | Kuckes | |
| 5,065,100 A | 11/1991 | Vail, III | |
| 5,084,678 A | 1/1992 | Hutin | |
| 5,189,415 A | 2/1993 | Shimada et al. | |
| 5,230,387 A | 7/1993 | Waters et al. | |
| 5,258,755 A | 11/1993 | Kuckes | |
| 5,305,212 A * | 4/1994 | Kuckes ................... | G01V 3/26 |
| | | | 324/346 |
| 5,485,089 A * | 1/1996 | Kuckes ............. | E21B 47/02216 |
| | | | 175/45 |
| 5,512,830 A | 4/1996 | Kuckes | |
| 5,582,248 A | 12/1996 | Estes | |
| 5,589,775 A | 12/1996 | Kuckes | |
| 5,923,170 A | 7/1999 | Kuckes | |
| 6,179,066 B1 | 1/2001 | Nasr et al. | |
| 6,525,540 B1 | 2/2003 | Kong et al. | |
| 6,985,814 B2 | 1/2006 | Mcelhinney | |
| 7,268,552 B1 | 9/2007 | Gerald, II et al. | |
| 7,703,548 B2 | 4/2010 | Clark | |
| 7,719,282 B2 | 5/2010 | Fanini et al. | |
| 7,962,287 B2 | 6/2011 | Clark | |
| 7,969,819 B2 * | 6/2011 | Hall ......................... | G01V 1/42 |
| | | | 340/853.3 |
| 8,011,451 B2 | 9/2011 | MacDonald | |
| 8,126,650 B2 | 2/2012 | Lu et al. | |
| 8,237,443 B2 | 8/2012 | Hopmann et al. | |
| 8,324,912 B2 | 12/2012 | Waid et al. | |
| 8,462,012 B2 | 6/2013 | Clark et al. | |
| 8,680,866 B2 | 3/2014 | Marsala et al. | |
| 8,749,243 B2 | 6/2014 | Bittar et al. | |
| 8,844,648 B2 | 9/2014 | Bittar et al. | |
| 9,581,718 B2 | 2/2017 | Rodney | |
| 9,702,240 B2 | 7/2017 | Bittar et al. | |
| 2002/0000808 A1 | 1/2002 | Nichols | |
| 2003/0137297 A1 | 7/2003 | Ganesan | |
| 2005/0218898 A1 | 10/2005 | Fredette et al. | |
| 2006/0113112 A1 * | 6/2006 | Waters ...................... | E21B 7/04 |
| | | | 175/61 |
| 2006/0131013 A1 | 6/2006 | Mcelhinney | |
| 2007/0126426 A1 | 6/2007 | Clark et al. | |
| 2008/0177475 A1 | 7/2008 | Mcelhinney et al. | |
| 2008/0275648 A1 | 11/2008 | Illfelder | |
| 2009/0164127 A1 | 6/2009 | Clark | |
| 2009/0178850 A1 * | 7/2009 | Waters ...................... | E21B 7/04 |
| | | | 175/45 |
| 2009/0260878 A1 | 10/2009 | Morley et al. | |
| 2009/0308657 A1 | 12/2009 | Clark et al. | |
| 2010/0194395 A1 | 8/2010 | Mcelhinney | |
| 2010/0300756 A1 | 12/2010 | Bergstrom et al. | |
| 2010/0332137 A1 * | 12/2010 | Meadows ......... | E21B 47/02216 |
| | | | 702/6 |
| 2011/0015862 A1 * | 1/2011 | Sato .................... | E21B 47/022 |
| | | | 702/6 |
| 2011/0018542 A1 | 1/2011 | Clark et al. | |
| 2011/0088890 A1 | 4/2011 | Clark | |
| 2011/0284731 A1 | 11/2011 | Roscoe et al. | |
| 2011/0290011 A1 | 12/2011 | Dowla et al. | |
| 2011/0308859 A1 | 12/2011 | Bittar et al. | |
| 2011/0309836 A1 | 12/2011 | Bittar et al. | |
| 2012/0001637 A1 | 1/2012 | Bittar et al. | |
| 2012/0013339 A1 | 1/2012 | Kuckes et al. | |
| 2012/0109527 A1 | 5/2012 | Bespalov et al. | |
| 2012/0139543 A1 | 6/2012 | McElhinney et al. | |
| 2012/0158305 A1 | 6/2012 | Rodney et al. | |
| 2012/0257475 A1 | 10/2012 | Luscombe et al. | |
| 2012/0273192 A1 | 11/2012 | Schmidt et al. | |
| 2012/0283951 A1 | 11/2012 | Li et al. | |
| 2012/0283952 A1 | 11/2012 | Tang et al. | |
| 2013/0056272 A1 | 3/2013 | Kuckes | |
| 2013/0068526 A1 | 3/2013 | Snyder et al. | |
| 2013/0069655 A1 | 3/2013 | McElhinney et al. | |
| 2013/0151158 A1 | 6/2013 | Brooks et al. | |
| 2013/0173164 A1 | 7/2013 | Zhang | |
| 2013/0184995 A1 | 7/2013 | Sinclair et al. | |
| 2013/0333946 A1 | 12/2013 | Sugiura | |
| 2014/0132272 A1 | 5/2014 | Cuevas et al. | |
| 2014/0145857 A1 | 5/2014 | Comparetto | |
| 2014/0191120 A1 | 7/2014 | Donderici et al. | |
| 2015/0013968 A1 | 1/2015 | Hsu et al. | |
| 2015/0240623 A1 | 8/2015 | Blangé et al. | |
| 2015/0378044 A1 | 12/2015 | Brooks | |
| 2016/0216396 A1 * | 7/2016 | Golla .................. | E21B 47/0905 |
| 2016/0258275 A1 | 9/2016 | Wu et al. | |
| 2016/0273338 A1 * | 9/2016 | Wu ......................... | G01V 3/26 |

FOREIGN PATENT DOCUMENTS

| | | |
|---|---|---|
| WO | WO-2013/162505 A1 | 10/2013 |
| WO | WO-2016/025230 A1 | 2/2016 |
| WO | WO-2016/025232 A1 | 2/2016 |
| WO | WO-2016/025235 A1 | 2/2016 |
| WO | WO-2016/025238 A1 | 2/2016 |
| WO | WO-2016/025241 A1 | 2/2016 |
| WO | WO 2016/025245 A1 | 2/2016 |
| WO | WO-2016/025247 A1 | 2/2016 |
| WO | WO-20161025237 A1 | 2/2016 |

OTHER PUBLICATIONS

Definition of cement accessed through Schlumberger Oilfield Glossary on Nov. 15, 2016 via http://www.glossary.oilfield.slb.com/Terms/c/cement.aspx, 3 pages.

"International Application Serial No. PCT/US2015/043557, International Search Report dated Oct. 19, 2015", 3 pgs.

(56) References Cited

OTHER PUBLICATIONS

"International Application Serial No. PCT/US2015/043557, Written Opinion dated Oct, 19, 2015", 5 pgs.

"International Application Serial No. PCT/US2015/043577, International Search Report dated Oct. 21, 2015" 3 pgs.

"International Application Serial No. PCT/US2015/043577, Written Opinion dated Oct. 21, 2015", 9 pgs.

"International Application Serial No. PCT/US2015/043580, International Search Report dated Nov. 11, 2015", 3 pgs.

"International Application Serial No. PCT/US2015/043580, Written Opinion dated Nov. 11, 2015", 9 pgs.

"International Application Serial No. PCT/US2015/043587, International Search Report dated Oct. 26, 2015", 3 pgs.

"International Application Serial No. PCT/US2015/043587, Written Opinion dated Oct. 26, 2015", 11 pgs.

"International Application Serial No. PCT/US2015/043604, International Search Report dated Oct. 28, 2015", 3 pgs.

"International Application Serial No. PCT/US2015/043604, Written Opinion dated Oct. 28, 2015", 14 pgs.

"International Application Serial No. PCT/US2015/043621, International Search Report dated Oct. 19, 2015", 3 pgs.

"International Application Serial No. PCT/US2015/043621, Written Opinion dated Oct. 19, 2015", 5 pgs.

"International Application Serial No. PCT/US2015/043639, International Search Report dated Oct. 27, 2015", 3 pgs.

"International Application Serial No. PCT/US2015/043639, Written Opinion dated Oct. 27, 2015", 10 pgs.

"U.S. Appl. No. 14/769,476, Restriction Requirement dated Aug. 12, 2016", 9 pgs.

"U.S. Appl. No. 14/769,539, Non Final Office Action dated Aug. 5, 2016", 32 pgs.

Van Dongen, Koen W. A., "A Directional Borehole Radar System for Subsurface-Imaging", DUP Science, (2002), 111 pgs.

"International Application Serial No. PCT/US2015/043566, International Search Report dated Oct. 26, 2015", 3 pgs.

"International Application Serial No. PCT/US2015/043566, Written Opinion dated Oct. 26, 2015", 11 pgs.

CA First Exam Report; Application serial No. 2,954,723 ; dated Dec. 5, 2017, 3 Pages.

CA First Exam Report; Application Serial No. 2,954,303; Nov. 29, 2017, 5 pages.

CA First Exam Report Application Serial No. 2,954,301; Nov. 29, 2017, 6 pages.

Canadian Application Serial No. 2,954,301; Examiner's Letter; dated Jun. 1, 2018, 6 pages.

CA Application Serial No. 2954674, Examiner's Letter, dated Dec. 12, 2017, 3 pages.

CA application serial No. 2954726 Examiner's Letter dated Dec. 12, 2017, 3 pages.

GCC Application Serial No. 2015/29857; GCC Examination Report; dated Jan 23, 2018.

GCC Application Serial No. 2015/29856, GCC Examination Report; dated Jan 23, 2018.

GCC Application Serial No. 2015/29871, GCC Examination Report, dated Feb 28, 2018, 5 Pages.

GCC Application Serial No. 2015/29874; GCC Examination Report; dated Jan 23, 2018, 6 pages.

GCC Application Serial No. 2015/29873; GCC Examination Report; dated Feb 8, 2018, 8 pages.

\* cited by examiner

Top

Fig. 13

Trimetric

Fig. 14

Front

Fig. 15

Right

WELL RANGING APPARATUS, SYSTEMS, AND METHODS

CROSS-REFERENCE TO RELATED APPLICATIONS

The present application is a U.S. National Stage Filing under 35 U.S.C. 371 from International Application No. PCT/US2015/043566, filed on 4 Aug. 2015, which application claims the benefit of priority to provisional application Ser. No. 62/035,877, filed Aug. 11, 2014; provisional application Ser. No. 62/037,440, filed Aug. 14, 2014; and provisional application Ser. No. 62/078,732, filed Nov. 12, 2014; each of which is incorporated herein by reference in its entirely.

BACKGROUND

With much of the world's easily obtainable oil having already been produced, new techniques are being developed to extract less accessible hydrocarbons. These techniques often involve drilling a borehole in close proximity to one or more existing wells. Examples of directed drilling near an existing well include well intersection for blowout control, multiple wells drilled from an offshore platform, and closely spaced wells for geothermal energy recovery. Another such technique is steam-assisted gravity drainage (SAGD) that uses a pair of vertically-spaced, horizontal wells constructed along a substantially parallel path, often less than ten meters apart. Careful control of the spacing contributes to the effectiveness of the SAGD technique.

One way to construct a borehole in close proximity to an existing well is "active ranging" or "access-dependent ranging" in which an electromagnetic source is located in the existing well and monitored via sensors on the drill string in the well under construction. Another technique involves systems that locate both the source and the sensor(s) on the drill string—relying on backscatter transmission from the target well to determine the range between the drilling well and the target well. These latter systems are sometimes called "passive ranging" or "access-independent" systems by those of ordinary skill in the art. In either case, the ranging techniques are sometimes limited in the degree of accuracy that can be obtained.

DETAILED DESCRIPTION

Introduction

Magnetic ranging has been widely used for various applications, including well intersection, well avoidance, SAGD, and others. One excitation method for magnetic ranging is surface excitation. Surface excitation is a popular method of generating a ranging signal. It is relatively easy to implement, without the need for complex cabling and equipment. When surface excitation is used, a current is injected into a target well casing at the surface of the well (e.g., at the well head). The current travels along the casing down-hole and generates a magnetic field down-hole that originates from the target via direct transmission, and can be measured at a distance (e.g., in a drilling well) for ranging purposes. As a result, the excitation signal down-hole may be relatively weak when the distance beneath the surface is great, due to the current leakage into conductive formations. Consequently, sensor noise often affects magnetic ranging accuracy at greater depths, leading to false signal measurements and failures in well location. Some of the embodiments described herein are designed to improve down-hole current strength and/or enhance the signal/noise ratio, for improved accuracy with respect to ranging measurement technology.

Such apparatus, methods, and systems can be even more useful when backscatter ranging is used: that is, when the excitation source is injected into the casing of the drilling well, or is attached to a drill string within the drilling well. In the case of backscatter ranging, the excitation source originates a direct transmission signal that impinges upon, and is then reflected from, the target well. When these backscatter transmission signals are received at a receiver in the drilling well, the resulting received ranging signals are even weaker than in the direct transmission case.

Thus, novel apparatus, methods, and systems are proposed to increase the strength of the received ranging signal, to improve the received signal-to-noise ratio (SNR), and to improve the accuracy of ranging signal measurements. In some embodiments, enhancements are realized in all three of these areas. By taking this approach, ranging system technology can be improved in a number of ways, via improved accuracy and reliability of individual ranging measurements. Therefore, the apparatus, methods, and systems proposed herein can be used to reduce measurement issues that arise due to noise, as well as to generate larger signals at great depths. The result is that the maximum detection ranges for existing ranging systems can be significantly improved. In some embodiments, the apparatus, methods, and systems described herein can be applied to electromagnetic (EM) telemetry applications.

Figure 1:
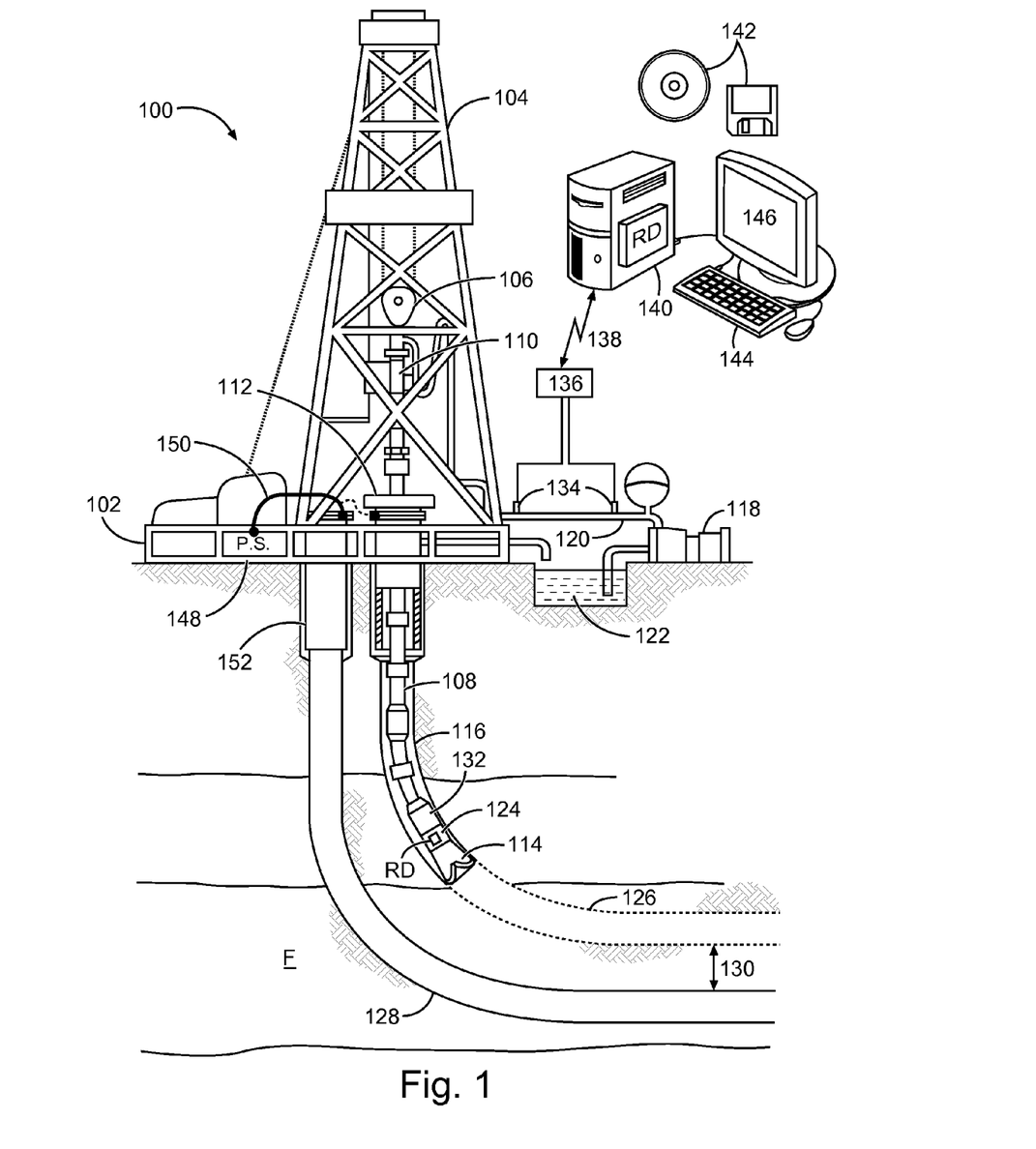
FIG. 1 depicts an example drilling environment in which ranging embodiments may be employed.

FIG. 1 depicts an example drilling environment 100 in which ranging embodiments may be employed. The disclosed apparatus (e.g., logging tools), systems, and methods are best understood in the context of the larger systems in which they operate. Accordingly, FIG. 1 illustrates an example drilling environment 100 in which a drilling platform 102 supports a derrick 104 having a traveling block 106 for raising and lowering a drill string 108. A top drive 110 supports and rotates the drill string 108 as it is lowered through the well-head 112. A drill bit 114 is driven by a downhole motor and/or rotation of the drill string 108. As the drill bit 114 rotates, it creates a borehole 116 that passes through various formations F. A pump 118 circulates drilling fluid through a feed pipe 120 to top drive 110, downhole through the interior of drill string 108, through orifices in drill bit 114, back to the surface via the annulus around drill string 108, and into a retention pit 122. The drilling fluid transports cuttings from the borehole into the retention pit 122 and aids in maintaining the borehole integrity.

The drill bit 114 is just one piece of a bottom-hole assembly (BHA) that includes one or more drill collars (comprising thick-walled steel pipe) to provide weight and rigidity to aid the drilling process. Some of these drill collars include logging instruments to gather measurements of various drilling parameters such as position, orientation, weight-on-bit, borehole diameter, etc. The tool orientation may be specified in terms of a tool face angle (also known as rotational or azimuthal orientation), an inclination angle (the slope), and a compass direction, each of which can be derived from measurements made by magnetometers, inclinometers, and/or accelerometers, though other sensor types such as gyroscopes may also be used. In one specific embodiment, the tool includes a three-axis fluxgate magnetometer and a three-axis accelerometer. As is known in the art, the combination of these two sensor systems enables the measurement of the tool face angle, inclination angle, and compass direction. In some embodiments, the tool face and hole inclination angles are calculated from the accelerometer sensor output, and the magnetometer sensor outputs are used to calculate the compass direction.

The BHA further includes a ranging tool 124 to receive signals from current injected by a power supply 148 into nearby conductors such as pipes, casing strings, and conductive formations and to collect measurements of the resulting field to determine distance and direction. Using measurements of these signals, in combination with the tool orientation measurements, the driller can, for example, steer the drill bit 114 along a desired path in the drilling well 126 relative to the existing well (e.g., target well) 128 in formation F using any one of various suitable directional drilling systems, including steering vanes, a "bent sub", and a rotary steerable system. For precision steering, the steering vanes may be the most useful steering mechanism. The steering mechanism can be controlled from the Earth's surface, or downhole, with a downhole controller programmed to follow the existing borehole 128 at a predetermined distance 130 and position (e.g., directly above or below the existing borehole).

The ranging tool 124 may comprise one or more elements, interchangeably designated as receivers or sensors in this document. These elements may comprise uniaxial, biaxial, or triaxial magnetometers, coil antennas, and/or telemetry receivers.

A telemetry sub 132 coupled to the downhole tools (including ranging tool 124) transmits telemetry data to the surface via mud pulse telemetry. A transmitter in the telemetry sub 132 modulates a resistance to drilling fluid flow to generate pressure pulses that propagate along the fluid stream at the speed of sound to the surface. One or more pressure transducers 134 convert the pressure signal into electrical signal(s) for a signal digitizer 136. Note that other forms of telemetry exist and may be used to communicate signals from downhole to the digitizer. Such telemetry may include acoustic telemetry, electromagnetic telemetry, or telemetry via wired drill pipe.

The digitizer 136 supplies a digital form of the telemetry signals via a communications link 138 to a computer 140 or some other form of a data processing device. The computer 140 operates in accordance with software (which may be stored on non-transitory information storage media 142) and user input provided via an input device 144 to process and decode the received signals. The resulting telemetry data may be further analyzed and processed by the computer 140 to generate a display of useful information on a computer monitor 146 or some other form of a display device. For example, an oil field service provider could employ this system to obtain and monitor drilling parameters, formation properties, and/or the path of the borehole relative to the existing borehole 128 and any detected formation boundaries. A downlink channel can then be used to transmit steering commands from the surface to the BHA. In some embodiments, the computer 140 has analog circuitry installed or is programmed to include a ranging determination module RD, which operates on the signal data received down hole at the ranging tool 124 to determine the distance and direction from the drilling well 126 to the target well 128. The ranging determination module RD may exist in the computer 140 or the tool 124, and may be used to implement any of the methods described herein.

Thus, FIG. 1 illustrates an electromagnetic ranging system with surface excitation. The power supply 148 at the surface employs a cable 150 to inject current into target well casing 152 and flowing down-hole so that magnetic fields can be generated surrounding a target well 128. Then sensors in the ranging tool 124 in the drilling well 126 can determine the magnetic field strength in various directions so that distance and direction between the target well 128 and drilling well 126 can be determined. The power supply 148 can also be connected to inject current into the casing of the drilling well 126.

The drilling well 126 and the target well 128 are often constructed as a cased hole, with cement installed around the outside of the casing material (e.g., conductive piping). In the completion phase of oil and gas wells, the cement serves to isolate the wellbore, helps prevent casing failure, and keeps the wellbore fluids from contaminating freshwater aquifers.

Tool configurations are described to enable gradient field measurements from, in some embodiments, substantially equally spaced sensors. Various embodiments are suitable for steam-assisted gravity drainage (SAGD) ranging applications (e.g., parallel ranging), as well as T-intersection ranging applications (e.g., well avoidance or well intersection applications).

Detailed Presentation

Sometimes the BHA is oriented with respect to the target well such that electromagnetic ranging sensors provide nearly equal field strength measurements. In effect, the sensors provide little or no differentiation as to distance from the target well, because the measured field strength components for each sensor are not substantially different. This situation makes it difficult or impossible to determine the range to the target well when the gradient field is used to make the range determination. In some embodiments, the tool configuration is used to enable determination of gradient fields from sensors in various ranging applications.

Figure 2:
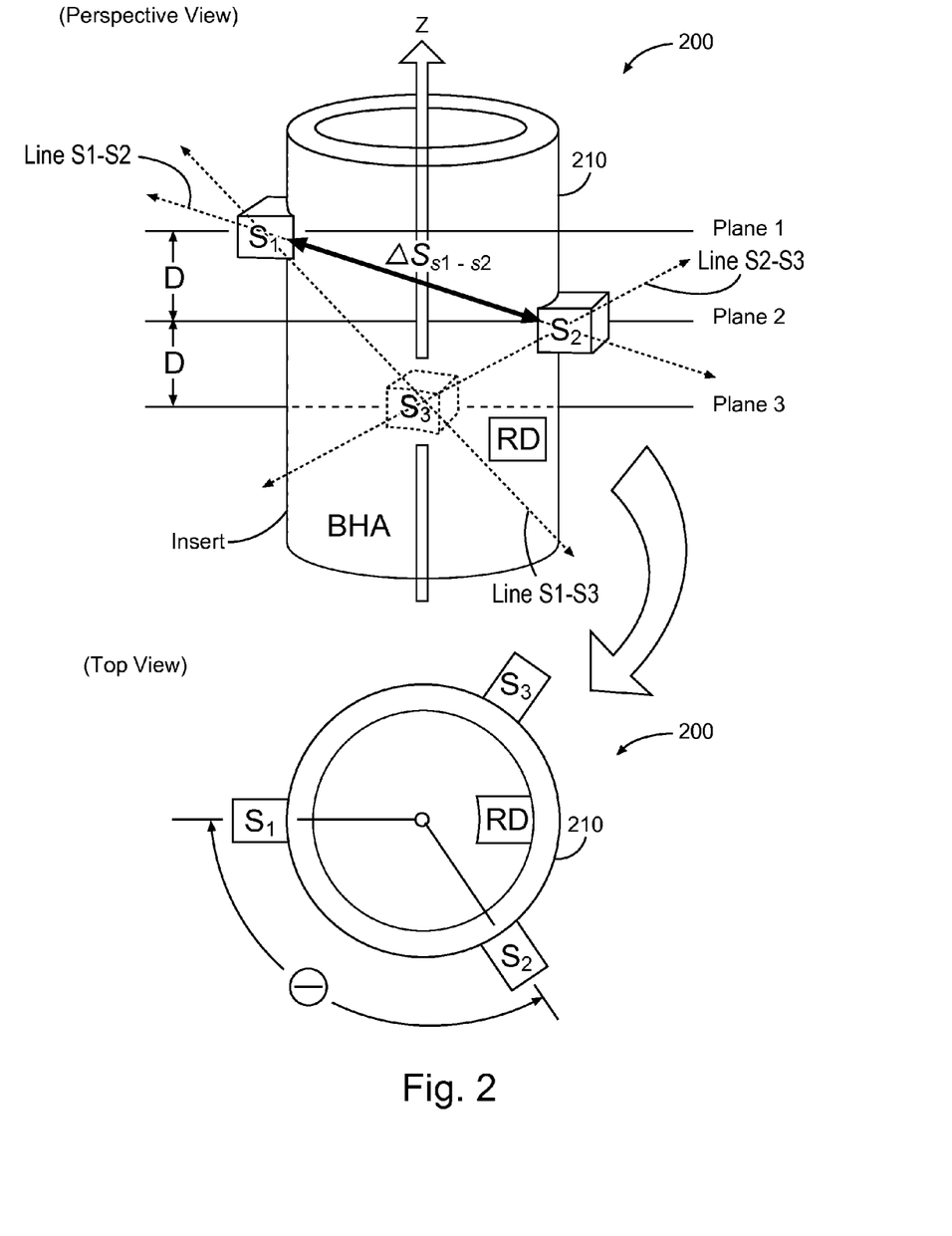
FIG. 2 is a block diagram of a well ranging apparatus, shown in perspective and top views, for various embodiments.

FIG. 2 is a block diagram of a well ranging apparatus 200, shown in perspective and top views, for various embodiments. Here the perspective view shows a housing 210, such as a down hole ranging tool housing or BHA, and at least three sensors S1, S2, and S3 attached to the BHA or other drill string component (that form the housing 210). The sensors S1, S2, S3 are not in the same azimuthal plane (e.g., here no two sensors are in the same azimuthal plane—each occupies its own respective azimuthal plane: S1 in Plane1, S2 in Plane2, and S3 in Plane3). The sensors S1, S2, and S3 are approximately equally spaced around the longitudinal axis z, as shown in the top view of figure. This simplifies gradient field calculations (although it is noted that in some embodiments, configurations with unequal spacing are used), to determine the range for any orientation of the target well with respect to the drilling well. Reference designations for the lines S1-S2, S2-S3, and S1-S3, as well as for the separation between the sensors $\Delta S_{S1-S2}$ are shown in FIG. 2, to support additional calculations that may be applied to additional embodiments.

For example, a finite difference method may be used to calculate total field and gradient field from two sensors S1, S2, as:

$$\begin{cases} \vec{H} = \dfrac{\vec{H}_1 + \vec{H}_2}{2} \\ \dfrac{\partial \vec{H}}{\partial r} = \dfrac{(\vec{H}_1 - \vec{H}_2)}{2\Delta S} \end{cases}$$

Then, using sensors S1 and S2, ranging sensitivity is given along the direction of the line S1-S2, with the total field and gradient field along the Line S1-S2, as follows:

$$\begin{cases} \vec{H}_{S1-S2} = \dfrac{\vec{H}_{S1} + \vec{H}_{S2}}{2} \\ \dfrac{\partial \vec{H}}{\partial r_{S1-S2}} = \dfrac{(\vec{H}_{S1} - \vec{H}_{S2})}{2\Delta S_{S1-S2}} \end{cases}$$

Similarly, the ranging sensitivity direction can be evaluated along a line through sensors S2-S3 (Line S2-S3) and along a line through sensors S1-S3 (Line S1-S3), using the pair of sensors S2 and S3, and the pair of sensors S1 and S3, respectively.

Figure 3:
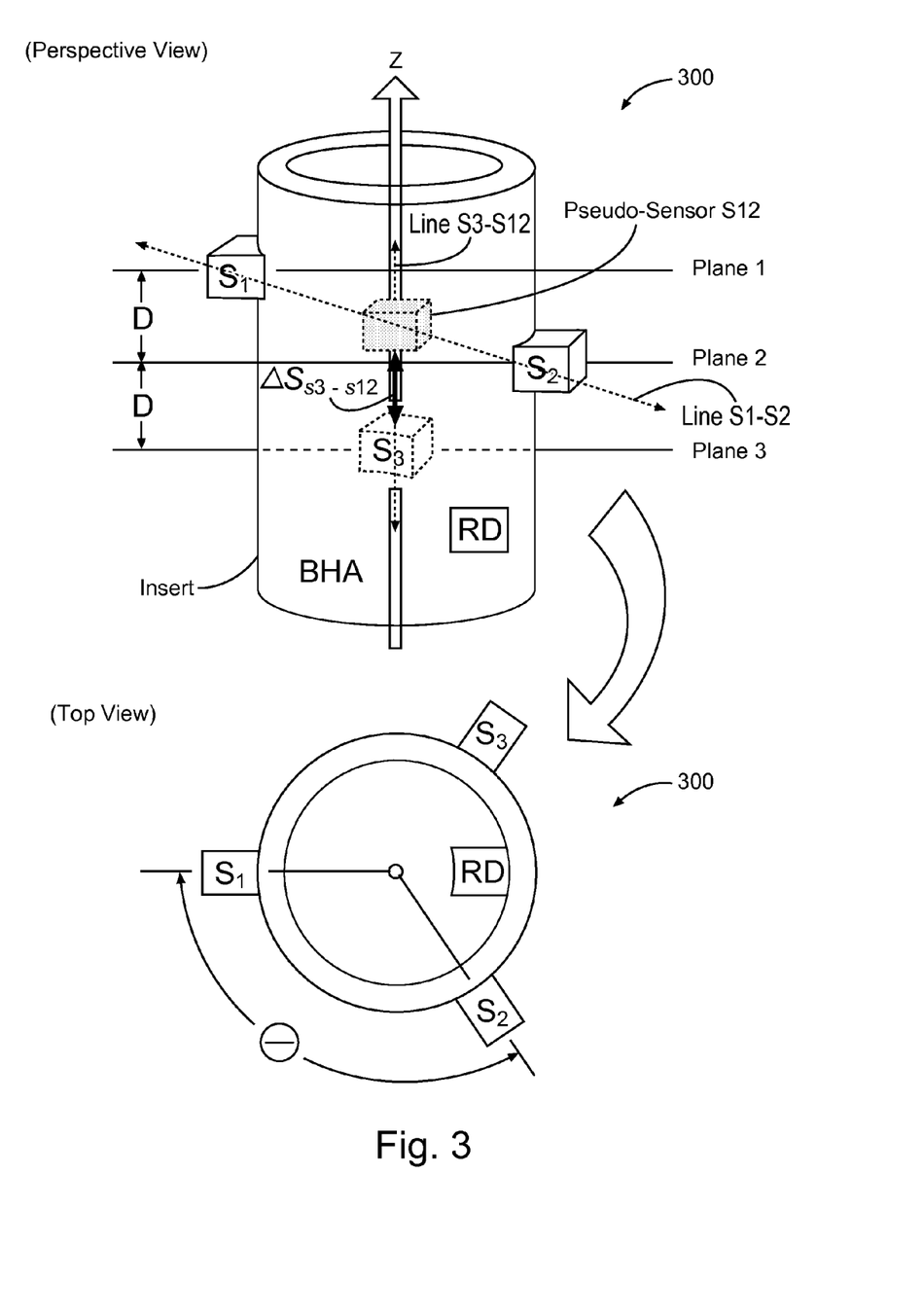
FIG. 3 is a block diagram of a well ranging apparatus, for various embodiments.

FIG. 3 is a block diagram of a well ranging apparatus 300, for various embodiments. In some embodiments, a pair of sensors can be used to create a pseudo-sensor. Additional reference designations are thus added to the figure, such as the line through sensors S1, S2 (i.e., Line S1-S2), the line through sensor S3 and the pseudo-sensor (Line S3-S12), and the distance between the line through sensors S1, S2 (Line S1-S2) and the pseudo-sensor, along the Line S3-S12 (i.e., $\Delta S_{S3-S12}$), to support additional calculations that may be applied to this embodiment.

Thus, in some embodiments, a first pair of two sensors (e.g., Sensors S1 and S2) can be used to create a pseudo sensor (Sensor S12) in the middle of the two selected physical Sensors S1 and S2. To determine the total field:

$$\vec{H}_{S12} = \dfrac{\vec{H}_{S1} + \vec{H}_{S2}}{2}.$$

Using the pseudo sensor S12 together with another available sensor (e.g., Sensor S3), a total field and gradient field can be generated in a new ranging sensitivity direction (e.g., along Line S3-S12). The formulas to determine the total field and gradient field along this line are as follows:

$$\begin{cases} \vec{H}_{S3-S12} = \dfrac{\vec{H}_{S3} + \vec{H}_{S12}}{2} \\ \dfrac{\partial \vec{H}}{\partial r_{S3-S12}} = \dfrac{(\vec{H}_{S3} - \vec{H}_{S12})}{2\Delta S_{S3-S12}} \end{cases}$$

Figure 4:
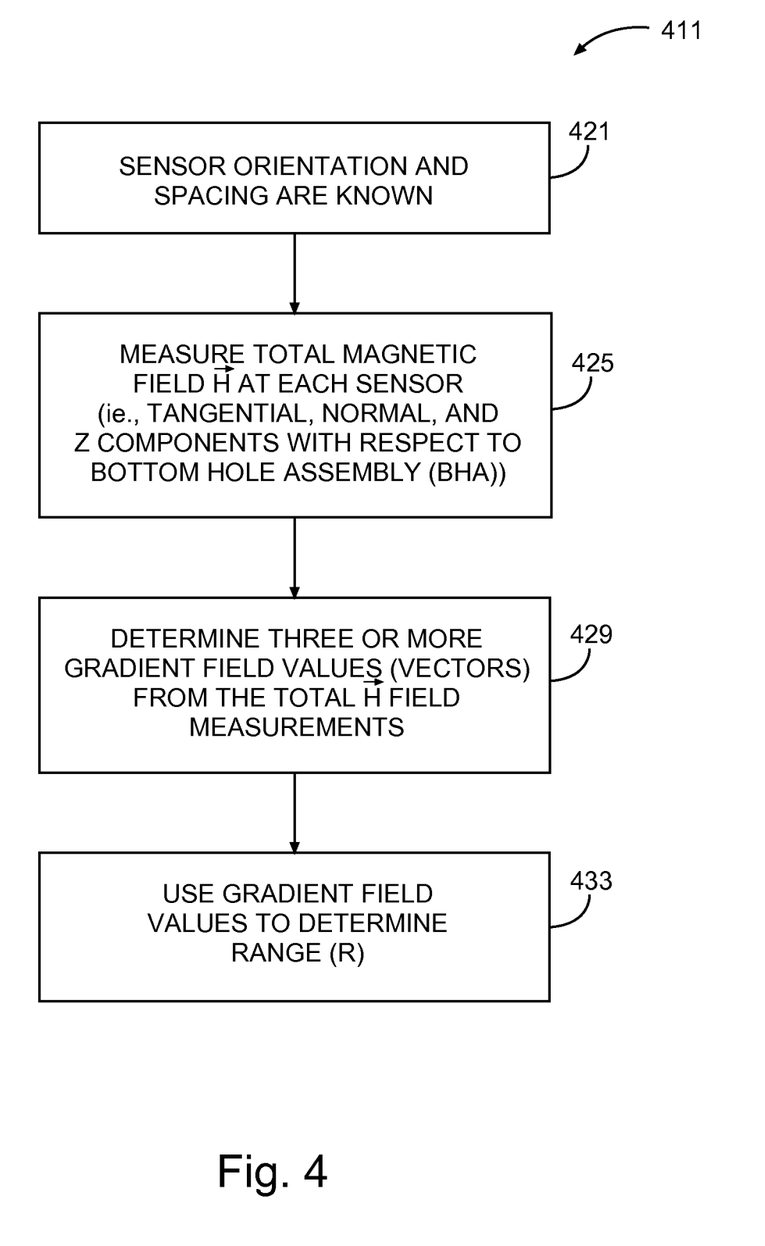
FIG. 4 is a flow diagram of a well ranging method, for various embodiments.
Figure 5:
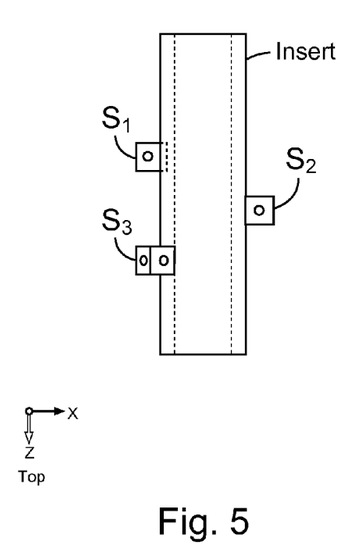
FIGS. 5-20 illustrate a variety of apparatus embodiments.
Figure 6:
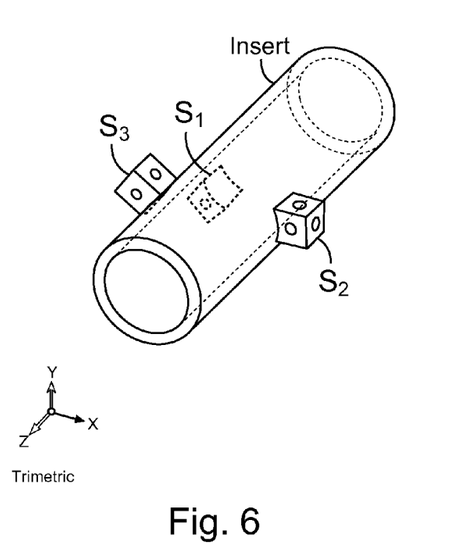
Figure 7:
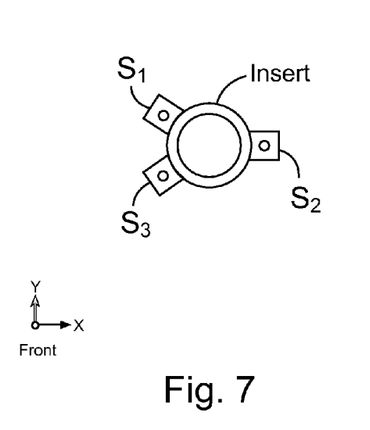
Figure 8:
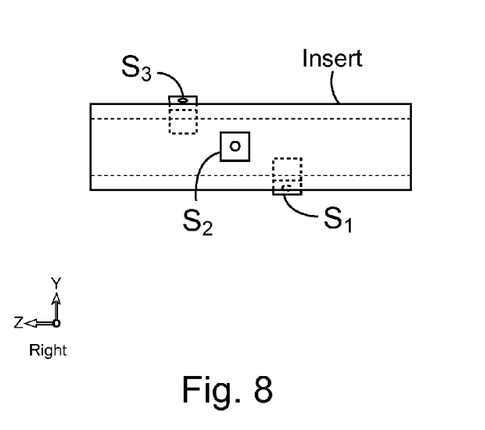
Figure 9:
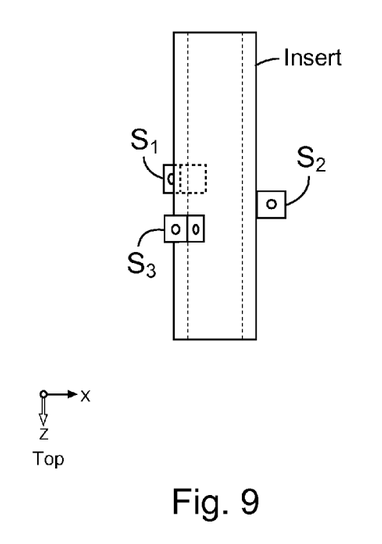
Figure 10:
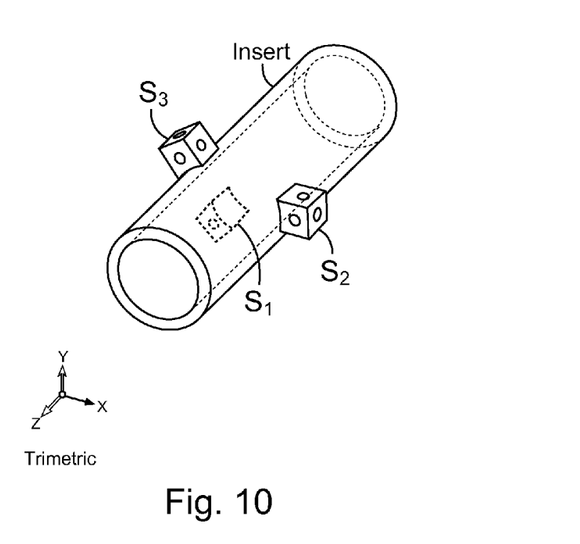
Figure 11:
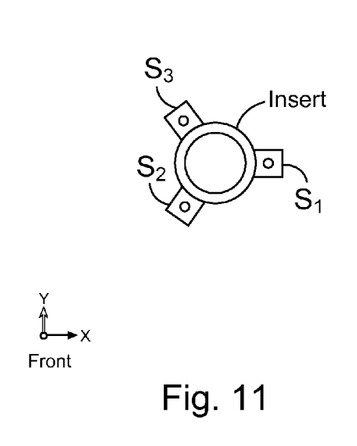
Figure 12:
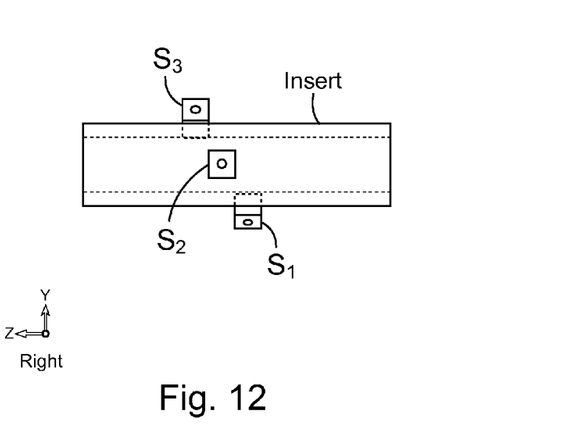
Figure 13:
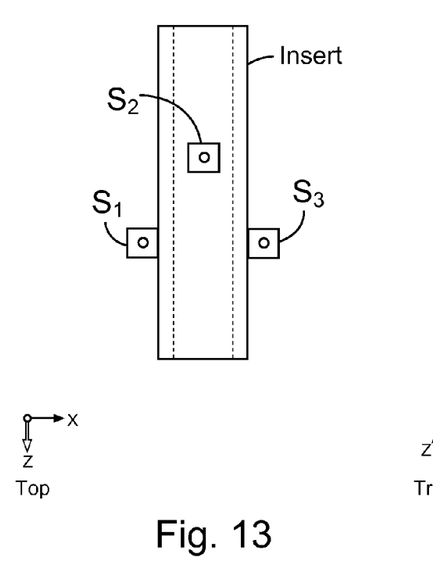
Figure 14:
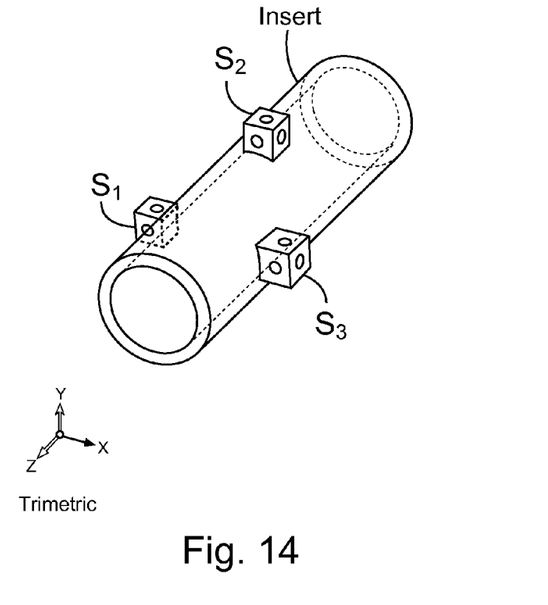
Figure 15:
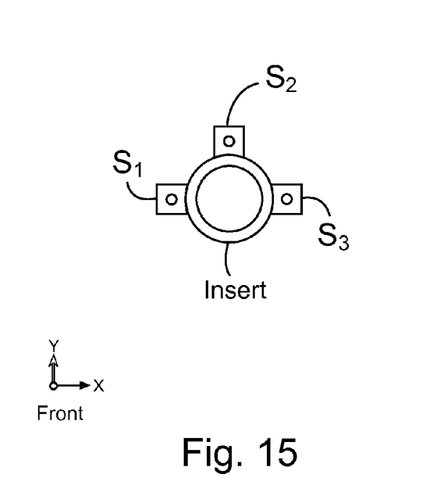
Figure 16:
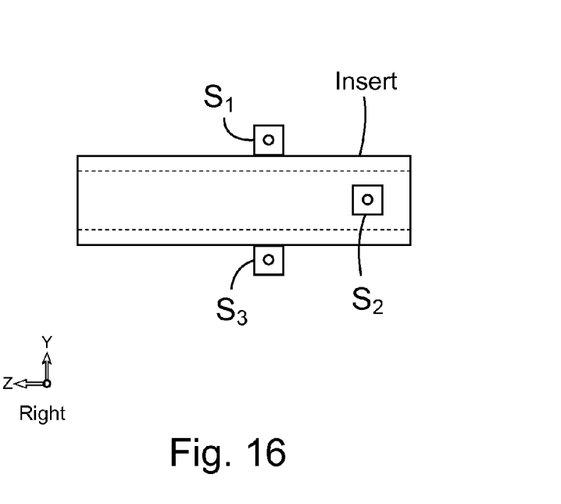
Figure 17:
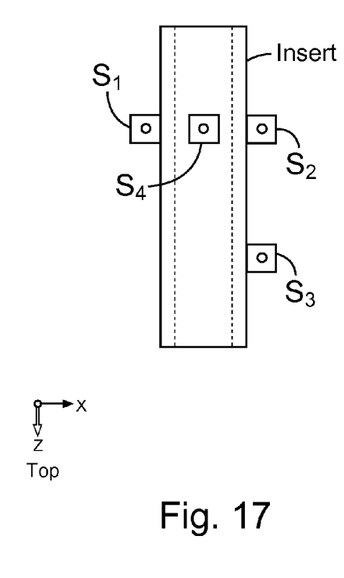
Figure 18:
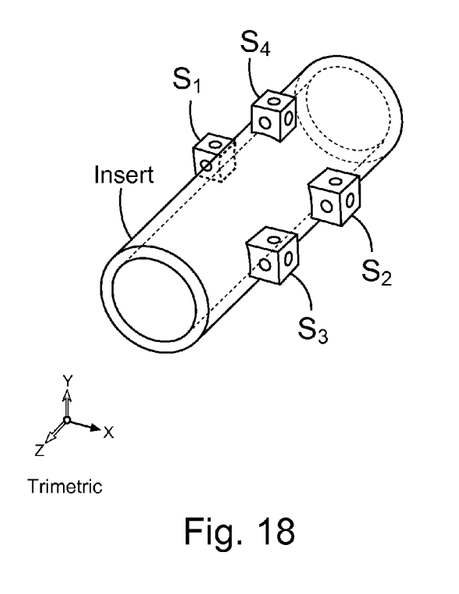
Figure 19:
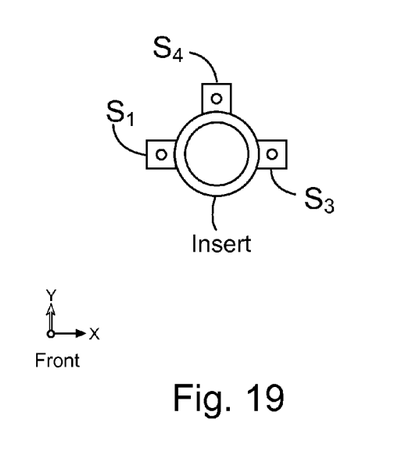
Figure 20:
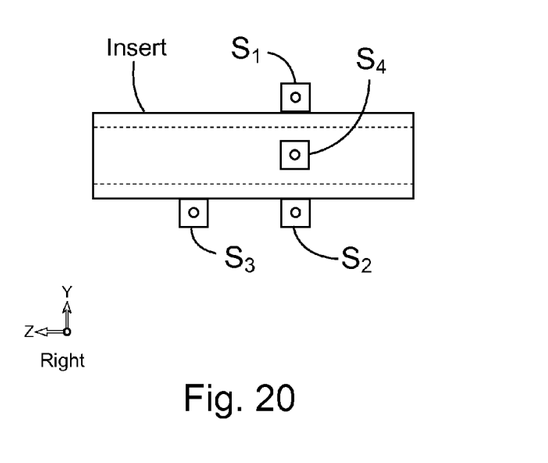

The generation of different ranging sensitivity directions, as described with respect to FIG. 3 can be applied to any of the embodiments described herein. The measurement of the field strength H at each sensor may include tangential, normal, or longitudinal components, or any of the three components with respect to different ranging applications FIG. 4 is a flow diagram of a well ranging method 411, for various embodiments. Calibration may become more difficult when the sensors are not in separate azimuthal planes, or not equally spaced from each other according to an angle θ around the longitudinal axis z, as shown in FIG. 3. In some embodiments, more than three sensors are used. The method 411 may include a method of using the apparatus 300 shown in FIG. 3.

Thus, in some embodiments, a method 411 begins at block 421 with acquiring the sensor orientation and spacing. The method 411 may continue at block 425 with measuring the total magnetic field $\vec{H}$ at each sensor, such as the tangential, normal, and z components of the magnetic field with respect to the BHA. Some embodiments of the method 411 continue on to block 429 with determining three or more gradient field values (e.g., vectors) from the total magnetic field $\vec{H}$ measurements. In some embodiments, the method 411 comprises using the gradient field values determined at block 429 to determine the range between wells, at block 433.

Calculations can be made to account for the separation distance between sets of two sensors, in the azimuthal direction shown by the angle θ (see FIG. 2), and in the longitudinal direction z (see FIGS. 2 and 3). When the separation is known in one or both directions, calculations can be simplified, and the operations of the related computing apparatus can be improved due to a reduction in the number of operations involved in determining an approximate range distance. The magnetic field that is measured can result from current injected at the target well, or via backscatter from the target well.

FIGS. 5-20 illustrate a variety of apparatus embodiments. Each of the embodiments comprises one possible arrangement of an insert and sensors S1, S2, S3, among many possible arrangements. In some embodiments, an insert may comprise a tool insert, such as a BHA insert, including a ranging tool housing.

For example, FIGS. 5-8 illustrate vertical, perspective, top, and horizontal views, respectively, of an insert with three sensors S1, S2, S3 attached at different azimuthal and longitudinal locations—so that none of the sensors has its azimuthal or longitudinal location in common with any of the others. Sensors S1 and S3 are approximately equidistant from sensor S2 in the longitudinal direction.

FIGS. 9-12 illustrate vertical, perspective, top, and horizontal views, respectively, of an insert with three sensors S1, S2, S3 attached at different azimuthal and longitudinal locations—so that none of the sensors has its azimuthal or longitudinal location in common with any of the others. However, in this case, sensors S1 and S3 are approximately equidistant from sensor S2 in the longitudinal direction, as well as the azimuthal direction.

FIGS. 13-16 illustrate vertical, perspective, top, and horizontal views, respectively, of an insert with three sensors S1, S2, S3 attached at different azimuthal locations; and sensors S1, S3 having a common longitudinal location. Thus, sensors S1 and S3 are approximately equidistant from sensor S2 in the longitudinal direction. Sensors S1 and S3 are also approximately equidistant from sensor S2 in the azimuthal direction.

FIGS. 17-20 illustrate vertical, perspective, top, and horizontal views, respectively, of an insert with four sensors S1, S2, S3, S4 attached. Sensors S2, S3 have a common azimuthal location, and sensors S1, S2, S4 have a common longitudinal location. Thus, sensors S1, S2, S4 are approximately equidistant from sensor S3 in the longitudinal direction, and sensors S1 and S2,S3 are approximately equidistant from sensor S4 in the azimuthal direction.

These solutions help reduce the effect of leakage current signals in the BHA by utilizing directional sensitivity to achieve ranging determination. The methods disclosed herein are useful for applications such as steam-assisted (SAGD), well avoidance, and well interception. The measured magnetic field at the ranging tool can result from current injected at the target well, or via backscatter radiation from the target well.

Additional Detailed Description and Some Representative Embodiments

Figure 21:
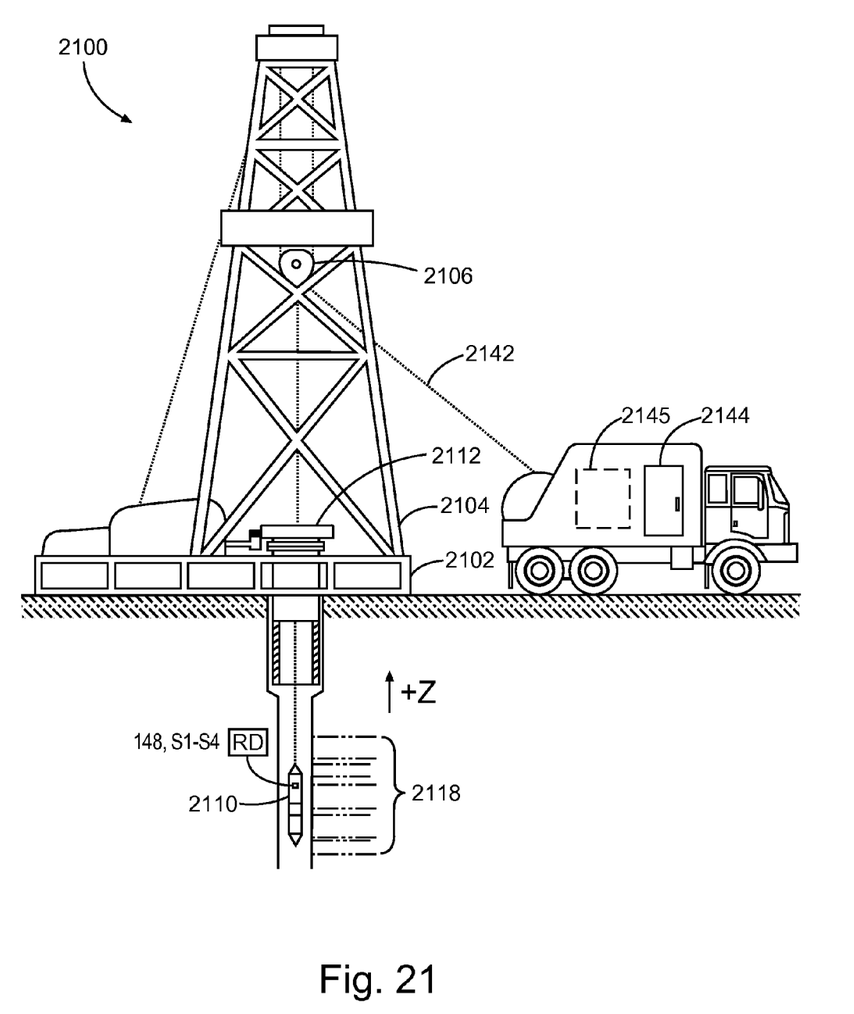
FIG. 21 is a block diagram of a wireline system implementation of various embodiments.

FIG. 21 is a block diagram of a wireline system 2100 implementation of various embodiments. The system 2100 of FIG. 21 may include any of the embodiments of receiver or sensor mounting discussed previously. In this case, a hoist 2106 may be included as a portion of a platform 2102, such as coupled to a derrick 2104, and used to raise or lower equipment such as a wireline sonde 2110 into or out of a borehole. The wireline sonde 2110 may include any one or more of the above-described embodiments, including sensors S1, S2, S3, S4 and a range determination module RD.

In this wireline example, a cable 2142 may provide a communicative coupling between a logging facility 2144 (e.g., including a processor circuit 2145 including memory or other storage or control circuitry) and the sonde 2110. In this manner, information about the formation 2118 may be obtained. The processor circuit 2145 can be configured to access and execute instructions stored in a memory to implement any of the methods described herein (e.g., by accessing a range determination module RD).

Figure 22:
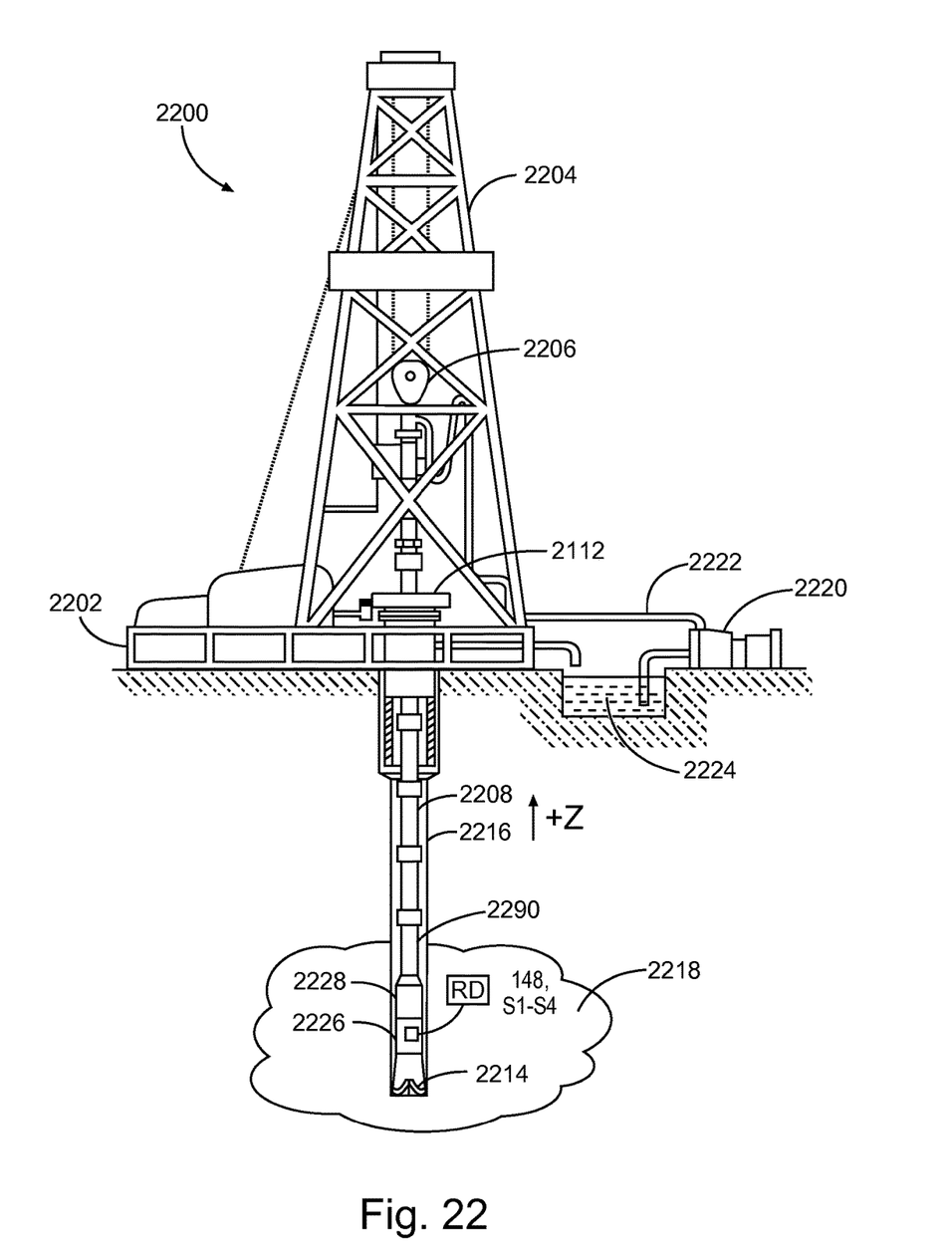
FIG. 22 is a block diagram of a drilling system implementation of various embodiments.

FIG. 22 is a block diagram of a drilling system implementation of various embodiments. This diagram shows a drilling rig system 2200 according to various embodiments that may include measurement while drilling (MWD) or logging while drilling (LWD) capability. The drilling apparatus can use data from an insert in the drill string 2208, having attached to a number of receivers or sensors as discussed previously, and using acquired and calculated ranging information to steer the drill bit 2214.

A drilling rig or platform 2102 generally includes a derrick 2104 or other supporting structure, such as including or coupled to a hoist 2106. The hoist 2106 may be used for raising or lowering equipment or other apparatus such as drill string 2208. The drill string 2208 may access a borehole 2216, such as through a well head 2112. The lower end of the drill string 2208 may include various apparatus, such as a drill bit 2214, such as to provide the borehole 2216.

A drilling fluid or "mud" may be circulated in the annular region around the drill bit 2214 or elsewhere, such as provided to the borehole 2216 through a supply pipe 2222, circulated by a pump 2220, and returning to the surface to be captured in a retention pit 2224 or sump. Various subs or tool assemblies may be located along the drill string 2208, such as a bottom hole assembly (BHA) 2226 or a second sub 2228. The BHA 2226 and/or the sub 2228 may include one or more sensors or receivers (e.g., including sensors S1, S2, S3, S4), as described herein, along with a current source (e.g., power supply 148) to initiate a ranging signal, and a processor with access to a memory that contains a program to implement any of the methods described herein (e.g., a ranging determination module RD).

Thus, some of the embodiments described herein may be realized in part, as a set of instructions on a computer readable medium 142 comprising ROM, RAM, CD, DVD, hard drive, flash memory device, or any other computer readable medium, now known or unknown, that when executed causes a computing system, such as computer as illustrated in FIG. 1 or some other form of a data processing device 140, to implement portions of a method of the present disclosure, for example the methods described in FIG. 4 (e.g., for computer-assisted well completion).

Though described serially in the examples of FIG. 4, one of ordinary skill in the art would recognize that other examples may reorder the operations, omit one or more operations, and/or execute two or more operations in parallel using multiple processors or a single processor organized as two or more virtual machines or sub-processors. Moreover, still other examples can implement the operations as one or more specific interconnected hardware or integrated circuit modules with related control and data signals communicated between and through the modules. Thus, any process flow is applicable to software, firmware, hardware, and hybrid implementations.

It is expected that the system range and performance can be extended with the various embodiments described herein. Power can often be saved, and accuracy of ranging measurements improved. Signal components may be extracted and converted to pixel colors or intensities and displayed as a function of tool position and azimuth. Assuming the target casing string is within detection range, it may appear as a bright (or, if preferred, a dark) band in the image. The color or brightness of the band may indicate the distance to the casing string, and the position of the band indicates the direction to the casing string. Thus, by viewing such an image, a driller can determine in a very intuitive manner whether the new borehole is drifting from the desired course and he or she can quickly initiate corrective action. For example, if the band becomes dimmer, the driller can steer towards the casing string. Conversely, if the band increases in brightness, the driller can steer away from the casing string. If the band deviates from its desired position directly above or below the casing string, the driller can steer laterally to re-establish the desired directional relationship between the boreholes.

While the text of this document has been divided into sections, it should be understood that this has been done as a matter of convenience, and that the embodiments discussed in any one section may form a part of any or more embodiments described in another section, and vice-versa. Moreover, various embodiments described herein, including those in the following paragraphs, may be combined with each other, without limitation. Thus, many embodiments may be realized. Some of these will now be listed in a non-limiting fashion.

In some embodiments, an apparatus 300 comprises a down hole tool housing attached to three electromagnetic field strength sensors S1, S2, S3, each of the sensors to measure electromagnetic field strength components along three different axes comprising a normal component N, a tangential component T, and a vertical component z, wherein at least one of the sensors is spaced apart from another one of the sensors in a longitudinal direction of the housing.

In some embodiments, at least one of the sensors is spaced apart from the other two sensors in the longitudinal direction of the housing. In some embodiments, each one of the sensors is spaced apart from the other two sensors in the longitudinal direction of the housing. In some embodiments, each of the sensors is spaced approximately equidistant from the other two sensors in an azimuthal plane of the housing.

Some embodiments comprise a fourth electromagnetic field strength sensor S4. In some embodiments, the fourth electromagnetic field strength sensor is spaced approximately equidistant from two of the three electromagnetic field strength sensors S1, S2, S3 in an azimuthal plane of the housing (e.g., an insert).

Some embodiments comprise a range determination module RD to receive signals representing magnetic field strength values from the sensors, and to determine an approximate range from the sensors disposed in a first well, to a second well, via direct transmission or backscatter transmission of electromagnetic waves. In some embodiments, the first well comprises a drilling well, and the second well comprises a target well.

In some embodiments, a system comprises a source of current or voltage (e.g., a power supply 148) to electrically couple to a well casing of a well or to attach to a down hole tool housing; and an apparatus (e.g., ranging tool 124). The apparatus may comprise a range determination module RD to receive electromagnetic field strength measurements from three electromagnetic field strength sensors attached to the down hole tool housing, each of the sensors to measure electromagnetic field strength components along three different axes comprising a normal component N, a tangential component T, and a vertical component z, wherein at least one of the sensors is spaced approximately equidistant from the other two sensors in an azimuthal plane of the housing, and wherein at least one of the sensors is spaced apart from another one of the sensors in a longitudinal direction of the housing.

In some embodiments, the source comprises a source of current to couple current to the well casing of the well comprising a target well. In some embodiments, the apparatus comprises a drill string.

In some embodiments, the down hole tool housing comprises one or more of a wireline sonde, a bottom hole assembly, a drill collar, a drill string pipe, or a sub.

In some embodiments, a method of range determination makes use of sensors spaced apart from one another in the azimuthal and longitudinal directions. Thus, in some embodiments, a method 411 comprises measuring a total magnetic field strength at each of three sensors attached to a down hole tool housing, wherein each sensor is to provide normal, tangential, and longitudinal field strength component amplitude values, and wherein at least one of the sensors is attached to the housing spaced approximately equidistant from the other two sensors in an azimuthal plane of the housing, and wherein at least one of the sensors is spaced apart from another one of the sensors in a longitudinal direction of the housing.

In some embodiments, the method further comprises determining at least three gradient field values from the total magnetic field strength measured by the three sensors; and determining an approximate range from a first well in which the sensors are disposed, to a casing of a second well, using the at least three gradient field values.

In some embodiments, determining the approximate range from the first well comprises determining the approximate range from a drilling well in which the sensors are disposed, to the casing of the second well comprising a target well casing.

In some embodiments, each one of the sensors is spaced apart from another one of the sensors in the longitudinal direction of the housing. In some embodiments of the method, each one of the sensors is spaced approximately equidistant from the other two sensors in the azimuthal plane of the housing.

In some embodiments, a finite difference method is used to calculate the total magnetic field strength and total magnetic gradient field from two of the sensors, along a line including the two sensors.

In some embodiments, a ranging sensitivity direction is determined for each of three pairs of sensors, comprising three paired combinations of the three sensors.

In some embodiments, a pair of the sensors as physical sensors is used to create a pseudo sensor between the pair, and the total magnetic field strength $\vec{H}_{S12}$ for the pseudo sensor is determined according to the formula:

$$\vec{H}_{S12} = \frac{\vec{H}_{S1} + \vec{H}_{S2}}{2},$$

wherein $\vec{H}_{S1}$ is the total magnetic field strength of one of the pair, and wherein $\vec{H}_{S2}$ is the total magnetic field strength of the other one of the pair.

In some embodiments, the total magnetic field strength and total magnetic gradient field are determined, in part, according to the formulas:

$$\begin{cases} \vec{H}_{S3-S12} = \frac{\vec{H}_{S3} + \vec{H}_{S12}}{2} \\ \frac{\partial \vec{H}}{\partial r_{S3-S12}} = \frac{(\vec{H}_{S3} - \vec{H}_{S12})}{2\Delta S_{S3-S12}} \end{cases},$$

wherein $\vec{H}_{S12}$ is the total magnetic field strength of the pseudo sensor, wherein $\vec{H}_{S3}$ is the total magnetic field strength of a third one of the sensors, and wherein $\Delta S_{S3-S12}$ is a longitudinal distance between the third sensor of the sensors and the pseudo sensor, along a line that includes the third sensor of the sensors and the pseudo sensor.

In some embodiments, an apparatus comprises a down hole tool housing (e.g., ranging tool 124) attached to a set of sensors, the down hole tool housing comprising one or more of a wireline sonde, a bottom hole assembly, a drill collar, a drill string pipe, or a sub. Some embodiments of this apparatus further comprise a processor (e.g., computer 140) communicatively coupled to the set of sensors to receive electromagnetic signal strength signals from the sensors, and to a memory (e.g., medium 142), the memory having a set of instructions which, when executed by the processor, cause the processor to implement any of the methods described herein.

In some embodiments, a system comprises a source of current or voltage (e.g., power supply 148) to electrically couple to a well casing of a first well or to attach to a first down hole tool housing. Some embodiments of this system further comprise a drill string to be disposed in a second well and mechanically coupled to a second down hole tool housing, the second down hole tool housing attached to a set of sensors. Some embodiments of this system further comprise a processor (e.g., computer 140) communicatively coupled to the set of sensors to receive signals representing electromagnetic field strength from the sensors, in response to the source exciting the well casing directly to initiate direct signal transmission, or indirectly via backscatter transmission, the processor communicatively coupled to a memory (e.g., medium 142) having a set of instructions which, when executed by the processor, cause the processor to implement any of the methods described herein.

Numerous other variations and modifications will become apparent to those skilled in the art once the above disclosure is fully appreciated. For example, the foregoing discussion has focused on a logging while drilling implementation, but the disclosed techniques would also be suitable for wireline tool implementation (as shown in FIG. 21). It is intended that the following claims be interpreted to embrace all such variations and modifications.

In this description, references to "one embodiment" or "an embodiment," or to "one example" or "an example" mean that the feature being referred to is, or may be, included in at least one embodiment or example of the invention. Separate references to "an embodiment" or "one embodiment" or to "one example" or "an example" in this description are not intended to necessarily refer to the same embodiment or example; however, neither are such embodiments mutually exclusive, unless so stated or as will be readily apparent to those of ordinary skill in the art having the benefit of the knowledge provided by this disclosure. Thus, the present disclosure includes a variety of combinations and/or integrations of the embodiments and examples described herein, as well as further embodiments and examples, as defined within the scope of all claims based on this disclosure, as well as all legal equivalents of such claims.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. An apparatus, comprising:
   a down hole tool housing attached to three electromagnetic field strength sensors, each of the sensors to measure electromagnetic field strength components along three different axes comprising a normal component N, a tangential component T, and a vertical component z, wherein the three electromagnetic field strength sensors are spaced around the downhole tool housing in a longitudinal direction and wherein each electromagnetic field strength sensor occupies a respective azimuthal plane, and
   a non-transitory machine readable medium having program code executable by a processor to cause the processor to determine a gradient field value along a direction of a line through a given one of the electromagnetic field strength sensors.

2. The apparatus of claim 1, wherein at least one of the sensors is spaced apart from the other two sensors in the longitudinal direction of the housing.

3. The apparatus of claim 1, wherein each one of the sensors is spaced apart from the other two sensors in the longitudinal direction of the housing.

4. The apparatus of claim 1, wherein each of the sensors is spaced approximately equidistant from the other two sensors.

5. The apparatus of claim 1, further comprising:
   a fourth electromagnetic field strength sensor.

6. The apparatus of claim 5, wherein the fourth electromagnetic field strength sensor is spaced approximately equidistant from two of the three electromagnetic field strength sensors.

7. The apparatus of claim 1, further comprising:
   a range determination module to receive signals representing magnetic field strength values from the sensors, and to determine an approximate range from the sensors disposed in a first well, to a second well, via direct transmission or backscatter transmission of electromagnetic waves.

8. The apparatus of claim 7, wherein the first well comprises a drilling well, and wherein the second well comprises a target well.

9. The apparatus of claim 1, wherein the three different axes are with respect to a bottom hole assembly.

10. The apparatus of claim 1, wherein the gradient field value indicates how electromagnetic field strength components change as a function of position along the line; and wherein the gradient field value is based on the measured electromagnetic field strength components at the given one of the electromagnetic field strength sensors.

11. The apparatus of claim 1, wherein a pair of the electromagnetic field strength sensors as physical sensors is used to create a pseudo sensor between the pair; and wherein the direction of the line passes through the pseudo sensor and the given one of the electromagnetic field strength sensors.

12. The method of claim 1, wherein the three electromagnetic field strength sensors spaced around the downhole tool housing comprises the three electromagnetic field strength sensors spaced around and outside the downhole tool housing.

13. A system, comprising:
    a source of current or voltage to electrically couple to a well casing of a well or to attach to a down hole tool housing; and
    an apparatus comprising a range determination module to receive electromagnetic field strength measurements from three electromagnetic field strength sensors attached to the down hole tool housing, each of the sensors to measure electromagnetic field strength components along three different axes comprising a normal component N, a tangential component T, and a vertical component z, wherein at least one of the sensors is spaced approximately equidistant from the other two sensors in an azimuthal plane of the housing, and wherein at least one of the sensors is spaced apart from another one of the sensors in a longitudinal direction of the housing and to determine a gradient field value along a direction of a line through a given one of the electromagnetic field strength sensors.

14. The system of claim 13, wherein the source comprises a source of current to couple current to the well casing of the well comprising a target well.

15. The system of claim 14, wherein the apparatus comprises a drill string.

16. The system of claim 13, wherein the down hole tool housing comprises one or more of a wireline sonde, a bottom hole assembly, a drill collar, a drill string pipe, or a sub.

17. The system of claim 13, wherein the three different axes are with respect to a bottom hole assembly.

18. The system of claim 13, wherein the gradient field value indicates how electromagnetic field strength changes as a function of position along the line, and wherein the gradient field value is based on the measured electromagnetic field strength at the given one of the electromagnetic field strength sensors.

19. The system of claim 13, wherein a pair of the electromagnetic field strength sensors as physical sensors is used to create a pseudo sensor between the pair; and wherein the direction of the line passes through the pseudo sensor and the given one of the electromagnetic field strength sensors.

20. A method, comprising:
positioning a down hole tool housing in a borehole of a subsurface formation;
injecting a current into a conductor arranged in the subsurface formation;
measuring a total magnetic field strength at each of three sensors attached to hall the down hole tool housing, wherein each sensor is to provide normal, tangential, and longitudinal field strength component amplitude values, and wherein at least one of the sensors is attached to the housing spaced approximately equidistant from the other two sensors in an azimuthal plane of the housing, and wherein at least one of the sensors is spaced apart from another one of the sensors in a longitudinal direction of the housing;
determining at least three gradient field values from the total magnetic field strength measured by the three sensors, wherein a given gradient field value is along a direction of a line through a given one of the sensors; and
determining an approximate range from a first well in which the sensors are disposed, to a casing of a second well, using the at least three gradient field values.

21. The method of claim 20, wherein determining the approximate range from the first well comprises:
determining the approximate range from a drilling well in which the sensors are disposed, to the casing of the second well comprising a target well casing.

22. The method of claim 20, wherein each one of the sensors is spaced apart from another one of the sensors in the longitudinal direction of the housing.

23. The method of claim 20, wherein each one of the sensors is spaced approximately equidistant from the other two sensors in the azimuthal plane of the housing.

24. The method of claim 20, wherein a finite difference method is used to calculate the total magnetic field strength and total magnetic gradient field from two of the sensors, along the line, the line including the two of the sensors.

25. The method of claim 20, wherein a ranging sensitivity direction is determined for each of three pairs of sensors, comprising three paired combinations of the three sensors.

26. The method of claim 20, wherein a pair of the sensors as physical sensors is used to create a pseudo sensor between the pair, and wherein the total magnetic field strength $\vec{H}_{S12}$ for the pseudo sensor is determined according to the formula:

$$\vec{H}_{S12} = \frac{\vec{H}_{S1} + \vec{H}_{S2}}{2},$$

wherein $\vec{H}_{S1}$ is the total magnetic field strength of one of the pair, and wherein $\vec{H}_{S2}$ is the total magnetic field strength of the other one of the pair.

27. The method of claim 26, wherein the total magnetic field strength and total magnetic gradient field are determined, in part, according to the formulas:

$$\begin{cases} \vec{H}_{S3-S12} = \frac{\vec{H}_{S3} + \vec{H}_{S12}}{2} \\ \frac{\partial \vec{H}}{\partial r_{S3-S12}} = \frac{(\vec{H}_{S3} - \vec{H}_{S12})}{2\Delta S_{S3-S12}} \end{cases},$$

wherein $\vec{H}_{S12}$ is the total magnetic field strength of the pseudo sensor, wherein $\vec{H}_{S3}$ is the total magnetic field strength of a third one of the sensors, and wherein $\Delta S_{S3-S12}$ is a longitudinal distance between the third sensor of the sensors and the pseudo sensor, along a line that includes the third sensor of the sensors and the pseudo sensor.

28. The method of claim 20, wherein the three different axes are with respect to a bottom hole assembly.

29. The method of claim 20, wherein the gradient field value indicates how total magnetic field strength in the subsurface formation changes as a function of position along the line; and wherein the gradient field value is based on the measured total electromagnetic field strength at the given one of the sensors.

30. The method of claim 20, wherein a pair of the sensors as physical sensors is used to create a pseudo sensor between the pair; and wherein the direction of the line passes through the pseudo sensor and the given one of the sensors.

* * * * *